(12) United States Patent
Garg et al.

(10) Patent No.: US 12,361,679 B1
(45) Date of Patent: Jul. 15, 2025

(54) IMAGE CLASSIFICATION WITH MODALITY DROPOUT

(71) Applicant: Amazon Technologies, Inc., Seattle, WA (US)

(72) Inventors: Nikhil Garg, Berlin (DE); Suren Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 403 days.

(21) Appl. No.: 18/064,836

(22) Filed: Dec. 12, 2022

(51) Int. Cl.
  *G06V 10/764* (2022.01)
  *G06V 10/778* (2022.01)
  *G06V 10/82* (2022.01)
  *G06V 10/94* (2022.01)
  *G06V 30/19* (2022.01)

(52) U.S. Cl.
  CPC ........ *G06V 10/764* (2022.01); *G06V 10/7784* (2022.01); *G06V 10/82* (2022.01); *G06V 10/95* (2022.01); *G06V 30/19147* (2022.01)

(58) Field of Classification Search
  CPC ........... G06V 10/764; G06V 30/19147; G06V 10/82; G06V 10/95; G06V 10/7784
  See application file for complete search history.

(56) References Cited

U.S. PATENT DOCUMENTS

| | | | |
|---|---|---|---|
| 9,355,336 B1 * | 5/2016 | Jahagirdar | G06V 30/268 |
| 10,002,415 B2 | 6/2018 | Shen et al. | |
| 10,417,350 B1 * | 9/2019 | Mohamed | G06N 20/00 |
| 10,733,450 B1 * | 8/2020 | Goldenberg | G06V 20/41 |
| 11,257,006 B1 * | 2/2022 | Anschel | G06N 20/00 |
| 11,314,982 B2 * | 4/2022 | Price | G06N 3/045 |
| 11,436,816 B2 * | 9/2022 | Mizuta | G06V 10/82 |
| 11,615,246 B2 * | 3/2023 | Reisswig | G06F 40/284 |
| | | | 704/9 |

(Continued)

FOREIGN PATENT DOCUMENTS

CN    108986050 B    11/2020

OTHER PUBLICATIONS

Gou, "Knowledge Distillation: A Survey," arxiv.org, https://arxiv.org/abs/2008.05525, May 20, 2021 in 36 pages.

(Continued)

*Primary Examiner* — Manav Seth
(74) *Attorney, Agent, or Firm* — Knobbe, Martens, Olson & Bear, LLP

(57) ABSTRACT

Systems and methods are provided for classifying images associated with an item, and generating an image set for that item which includes image classifications determined to be helpful for the item type of the item. To classify images, an image classification model is generated and trained using two phases. The first phase uses intermediate model with text and visual processing to teach the model to recognize patterns created by text without requiring OCR at inference. The second phase uses visual processing to refine the model for use at inference. To generate an image set, image classifications helpful to an item type are identified, items are associated with item types, images are obtained for an item, the images are classified using the image classification model, missing image classifications set out in the preferred image set are identified, and a request or requests is generated for the missing image classifications.

20 Claims, 8 Drawing Sheets

(56) References Cited

U.S. PATENT DOCUMENTS

| | | | |
|---|---|---|---|
| 11,899,704 B2* | 2/2024 | Kulangara Muriyil | ...................... G06V 30/422 |
| 2019/0236394 A1 | 8/2019 | Price et al. | |
| 2020/0196011 A1* | 6/2020 | Wyatte | .................... G06F 18/24 |
| 2023/0129341 A1* | 4/2023 | Leong | ................. G06F 3/04842 382/173 |
| 2023/0230408 A1* | 7/2023 | Arroyo | ................. G06V 10/82 382/156 |
| 2025/0014374 A1* | 1/2025 | Panda | ..................... G06F 40/30 |

OTHER PUBLICATIONS

Hinton, "Improving neural networks by preventing co-adaptation of feature detectors," arsix.org, https://arxiv.org/abs/1207.0580, Jul. 2, 2012 in 18 pages.

* cited by examiner

IMAGE CLASSIFICATION WITH MODALITY DROPOUT

BACKGROUND

Computing systems can utilize communication networks to exchange data. In some implementations, one computing system, sometimes referred to as a client, requests content over a communication network from another computing system, sometimes referred to as a server. For example, the content may include text-based portions, image-based portions, video-based portions, audio-based portions, other portions, or some combination thereof. The server may provide the requested content to the client over the communication network, and the client may present the content upon receipt.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1A:
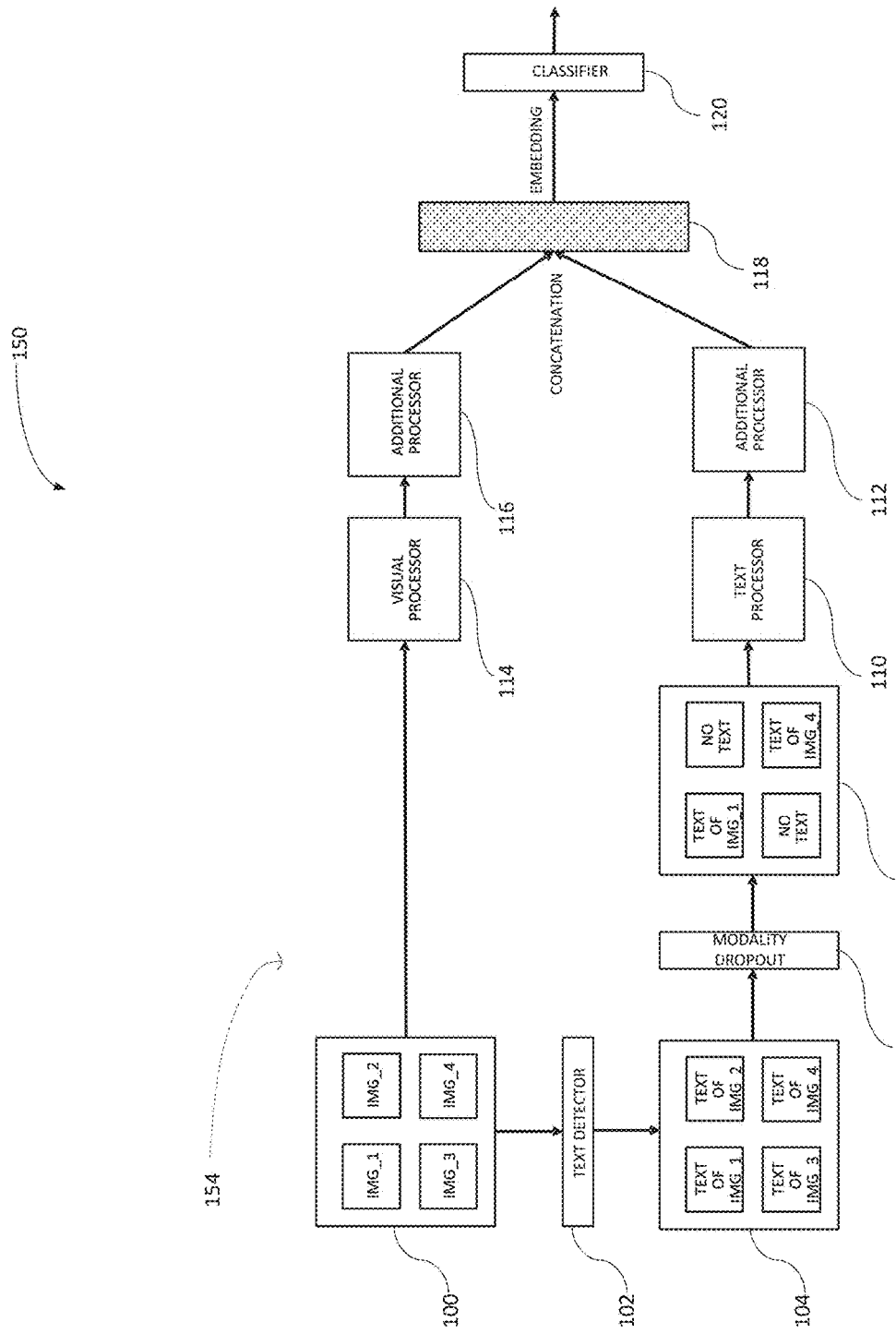
FIG. 1A is block diagram illustrating an embodiment of a multi-branch training of an image classification model.

The present disclosure relates to resource-efficient evaluation and selection of images to be presented in network-based content regarding items. More specifically, the present disclosure provides systems and methods for the training of a model for classification of images that may or may not include textual annotations, and use of the model in generating an image set for an item.

In some network-based content systems that provide information regarding items (e.g., online marketplaces), many users can contribute images for an item. It is often beneficial for an item of a given item type to have an image set which contains certain image classes, such as: dimension, lifestyle, front view, side view, underside view, perspective view, other classes or some combination thereof. This is because some image classes may be more helpful in producing a desirable effect (e.g., causing item acquisition events of users) or otherwise in distinguishing an item from among a group of similar items of an item type. For example, for an item type of furniture, an image with text information containing dimensions would be relevant in distinguishing one item of furniture from a group of other similar items of furniture. For a different item type, different image classes may be relevant. For example, for an item type of food, an image containing dimension information would likely not be very relevant in distinguishing one item of food from a group of other similar items of food. Instead, an image containing nutritional information might be very useful in distinguishing the item. Thus, in an image set for an item of furniture, it may be helpful to have an image classified as a dimension image. Similarly, in an image set for an item type of food, it may be helpful to have an image classified as a nutrition image.

One problem that may arise in classifying images to create such image sets is that images for an item or items are often obtained from users, and the names of these images are often not helpful in determining the class of images. For example, images may be submitted with generic names, such as IMG001, that provide little information about the content of the image. Text information, in addition to visual information, found in images may provide information on the content of the image that may be helpful in determining an image's class. For instance, in the examples described above, the text information containing dimensions and the text information containing nutrition information may have been helpful in classifying those images. However, such information is also often encoded such that systems have difficulty interpreting the data. For example, pixel-based formats include encoded image data for displaying images of objects. Many such images include text that is incidental to the depicted objects (e.g., text on signs, packages, etc.). Some images include text that is not merely incidental but is instead the primary feature or one of the primary features of images. "Infographics," for example, are images such as charts or diagrams that include presentation of textual information, often times in connection with non-textual items. Moreover, some infographics and other images may be properly classified in one class (e.g., dimension images), while other infographics and other images may be properly classified in a different class (e.g., nutrition images). Even if the text were to be extracted into a character-based format, for example by using OCR, the process would be time-consuming and costly to operate as a model at inference.

Some aspects of the present disclosure address some or all of the issues noted above, among others, by training an image classification model to analyze images that may include encoded text info and classifying images without the need for OCR prior to, or as part of, the model at inference.

One aspect of the disclosure provides an image set generation system for generating an image set for an item. A trained image classification model may be used to classify images and help ensure an item has an image set containing image classes determined to be relevant for the item type of the item. Such as image set may be referred to herein as a "preferred image set."

In some embodiments, the preferred image set for an item type is determined through market research, including customer surveys. Additionally, or alternatively, the preferred image set for an item type may be determined through analysis of user data (e.g., historical transaction data). In some embodiments, different image sets may be shown to randomly selected users, and the preferred image set may be determined based on user interaction data (e.g., transaction data). In some embodiments, the analysis of user data to determine the preferred image set for an item type is done using machine intelligence. In some embodiments, the image set generation system may be configured to determine the preferred image set for an item type.

In further embodiments, the image set generation system may be configured to update the preferred image set for an item type. These updates may include changing the composition of the preferred image set, including adding a new image class to the image set for an item type or removing a new image class from the preferred image set for an item type. In some embodiments, the updates may occur after a human operator determines that an update would be helpful. In some embodiments, the updates may occur after a system determines that an update would be helpful. In further embodiments, machine intelligence may be used to determine when to update the preferred image set for an item type.

The image set generation system may be configured to use the trained model to classify images obtained from users for an item. Furthermore, the image set generation system may be configured to determine whether all of the image classes in the preferred image set for the item are present. If any of the classifications of images in the preferred image set are not present, the image set generation system may be configured to generate a request for missing images. Additionally, or alternatively, the image set generation system may be configured to replace the missing images in order to complete the preferred image set.

Another aspect of the disclosure comprises training the image classification model to classify images into particular image classes to facilitate generation or selection of a preferred image set for an item. In some embodiments, the image classification model may be implemented as a machine learning model (e.g., a neural network, such as a convolutional neural network or "CNN").

For training purposes, the image classification model may be implemented as a multi-branch model that uses different processing branches to process input data in different modalities. As used herein, the term "modality" refers to a mode of presentation or experience. Examples of different modalities include image modalities (e.g., images or videos), text modalities (e.g., alphanumeric text), audio modalities (e.g., recorded audio), and the like. To classify images in particular image classes that may be included in a preferred image set for an item, a multi-branch model may include an image-based processing branch for input in an image modality, and a text-based processing branch for input in a text-based modality. The input for the text-based processing branch may be derived from the input for the image-based processing branch. For example, OCR may be performed on an image to generate text, and the image may be processed by the image-based processing branch while the OCR-generated text may be processed by the text-based processing branch.

In some embodiments, the image classification model is trained using a training set comprising retail images. Some or all of the images in the training set may contain text information. The images within the training set may be tagged with determined image classes that are useful in creating preferred image sets. For example, the classes may include dimension, lifestyle, front view, side view, underside view, perspective view, other classes or some combination thereof. These tagged images may then be used to train the image classification model for use in classifying images.

In some embodiments, the image classification model is trained in two phases. The first phase involves training an intermediate model as a multi-branch model with separate visual and text processing branches. Advantageously, the training in the first phase is done using a modality dropout approach in which the model is trained utilizing text data derived from some training images but not others. For example, text data derived from an image (e.g., using OCR) is used for some classification operations during the first phase of training, but the text data associated with other images is randomly or pseudo-randomly excluded from other classification operations during training (e.g., no input is provided to the text-based processing branch, or the output of the text-based processing branch is not used in the classification operation). An intermediate model trained in this manner is not entirely reliant on text data to classify images. In some embodiments, a second phase may then be performed using only the visual processing branch. Advantageously, this second phase may be performed to refine the model for use as a model at inference. For example, the text-based processing branch is disabled or removed from the intermediate model to produce a model, and training continues using only image input (without OCR derivation of text) in order to fine tune the model and verify its accuracy before use of the generated image classification model at inference. Beneficially, by avoiding the use of OCR, the speed of the system may in some implementations be improved while maintaining an accuracy level comparable to a system that uses OCR.

In some embodiments, generation of the image classification the model may be disabling or removing the text processing branch and readying the image classification model for deployment. Additionally, or alternatively, in some embodiments, deployment of the image classification model may involve sending it to a system where it can be accessed or used. In further embodiments, refining the model, as described above, may occur between removing the text processing branch and sending the image classification model to a system where it can be accessed or used.

In another aspect of the disclosure, an intermediate model uses teacher student model distillation. In teacher student model distillation, the teacher model is typically a fairly complex and well-performing model, and the student model is typically a less complex model. For example, the teacher model may have more or wider hidden layers than the student model. The goal of the teacher student model distillation is to train the student model to emulate the more complex teacher model in order to produce a smaller, more efficient, model with improved performance. To facilitate this training, aspects of the student and teacher model may be compared, as described in more detail below. In some embodiments, a teacher model is trained using a text-based processing branch and an image-based processing branch, and the student model is trained using only an image-based processing branch. In these embodiments, the text-based processing branch processes text derived from image input (e.g., text produced from performing OCR on the image).

Further embodiments relate to the use of a trained image classification model in an interactive network-based content delivery system to obtain images that may be associated with an item. In some embodiments these images may be obtained from users. In some embodiments, a plurality of image sets containing images related to an item may be received from multiple users. In further embodiments, the images of each image set may be classified with the generated image classification model, discussed above. Each image set of the plurality of image sets may have a score based on a number of parameters. The parameters may include, but are not limited to, the number of image classes present within the image set, inclusion of image classes present within the preferred image set, and the identity of the user who submitted the image set.

In some embodiments, the images may be screened with eligibility filters prior to processing with the generated image classification model. In further embodiments, the eligibility filters may screen out images that are not related to an item. In some embodiments, eligibility filters may screen out illegal content, such as content related to drug use. In some embodiments, a preferred image set is identified for the item. In further embodiments, the image classes present in the classified images are compared against the classes that are to be present in a preferred image set. In some embodiments, where image classes that are to be present in the preferred image set are missing from the classified images, additional steps are taken to obtain these image classes. In some embodiments, the additional steps comprise contacting users associated with the item. In some embodiments, the additional steps comprise generating the missing images.

Various aspects of the disclosure will be described with regard to certain examples and embodiments, which are intended to illustrate but not limit the disclosure. Additionally, any feature used in any embodiment described herein may be used in any combination with any other feature or in any other embodiment, without limitation.

Example Multi-Branch Training for Image Classification Model

With reference to an illustrative example, FIG. 1A shows an image classification model 150 implemented as a multi-branch model with separate visual and text processing branches (also referred to as visual and text processing pathways, or more generally as an image processing portion and a text processing portion).

In some embodiments, the image classification model 150 may be or include a convolutional neural network (CNN). Details of CNNs will now be described to illustrate merely one possible implementation of the model 150 or portions thereof (e.g., the visual pathway). It will be appreciated that model 150 or portions thereof may be implemented using alternative machine learning model structures and algorithms, including, but not limited to: Long Short Term Memory Networks (LSTMs), Recurrent Neural Networks (RNNs), Generative Adversarial Networks (GANs), Radial Basis Function Networks (RBFNs), Multilayer Perceptrons (MLPs), Self Organizing Maps (SOMs), Deep Belief Networks (DBNs), Restricted Boltzmann Machines (RBMs), Autoencoders, other models, or an ensemble thereof.

CNNs include many layers including one or more convolutional layers, one or more max pooling layers, and a set of fully-connected layers before an output layer. The convolutional layers and max pooling layers are used to iteratively "convolve" (e.g., use a sliding window to process portions of) an input image and determine a degree to which a particular "feature" (e.g., an edge, text information, an arrangement of text information, or other aspect of an object to be detected) is present in different portions of the input image. Aspects of this procedure may also be referred to as "feature mapping." The procedure may be performed using any number of sets of convolutional layers and max pooling layers. The result that is generated by the sets of convolutional layers and max pooling layers may be a matrix of numbers, such as floating-point numbers. The matrix may then be converted to a vector for processing by the set of fully-connected layers. In some embodiments, output of the fully-connected layers is then classified, or concatenated with output of other processing branches for classification. For example, a particular classification output value or set of output values may represent a classification as positive or negative (e.g., a value>-0.5 indicates a positive classification, a value<0.5 indicates a negative classification). In some embodiments, the output of the fully-connected layers or separate output generated by or otherwise derived from output generated by the convolutional layers can indicate the location(s) within the input image that are indicative of the image being a particular image class.

Returning to the illustrative example of FIG. 1A, the image classification model 150 may be trained by processing image set 100 using two (or more) processing branches. Each processing branch may process different aspects of the image set 100. In some examples, these aspects could include visual information and separate textual information extracted from the images. As illustrated by FIG. 1A, the image classification model 150 uses text processing branch 152 and visual processing branch 154. The output from these processing branches is combined into data structure 118, and an embedding is passed to classifier 120. For example, vector outputs from the visual processing branch 154 and text processing branch 152 are concatenated to produce a vector, and an embedding is generated and passed to the classifier 120, which produces classification output (e.g., a vector of numbers representing classification scores for each of a plurality of different image classes). The classification output may be evaluated against desired output, such as desired classes indicated by classification labels or tags as described in greater detail below. Parameters of the image classification model 150 may then be updated (e.g., based on a loss function) so that the model 150 is more likely to identify the correct class in the future. Processing of images in the image set 100 by the image classification model 150 in this manner may be repeated until a desired stopping point is reached.

Training Data

As discussed above, image classification model 150 may be trained using an image set 100. Image set 100 may constitute a training set of image files including all of the images used in training image classification model 150. Image set 100 may also constitute a subset of images in a larger training set. Images in the training set may be obtained from users. Images in the training set may include images associated with one or more items.

Images in the training set may be encoded in a pixel-based format, and some or all of the images may include text that is encoded with the visual data in the pixel-based format. Images in the training set may be labeled (also referred to as "pre-tagged") with image class information regarding the class (or classes) into which the image is properly classified. Referring to the illustrative example of FIG. 4, image 400 could be pre-tagged by the following classes: lifestyle, perspective, other classes, or some combination thereof. Image 402 could be pre-tagged by the following classes: front view, composition, other classes, or some combination thereof. Image 404 could be pre-tagged by the following classes: dimension, perspective, other classes, or some combination thereof. Image 406 could be pre-tagged by the following classes: feature, perspective, other classes, or some combination thereof.

Although the examples of images with text information as described herein are generally image files of individual still images, the examples are illustrative only and are not intended to be limiting, required, or exhaustive. In some embodiments, any image data encoded in a pixel-based format may be used, including images or videos (e.g., sets of images as frames to be evaluated and translated frame-byframe). For example, the pixel-based format may be one of: bitmap; Joint Photographic Experts Group (JPEG); Portable Network Graphics (PNG); Tagged Image File Format (TIFF); various RAW image formats; Graphics Interchange Format (GIF); Motion Picture Experts Group (MPEG); MPEG-2; MPEG-4; Audio Video Interleave (AVI); or the like.

Text Pathway

With regard to text processing branch 152, image set 100 may first be processed with text detector 102. Text detector 102 may use text detection, such as OCR, to extract text data from image set 100. The output of text detector 102 may become text set 104, which may contain text data associated with the images from image set 100.

In modality dropout 106, a percentage of text data of text set 104 may excluded from further processing by the text processing branch 152 (e.g., "dropped out"). In some embodiments, modality dropout 106 may utilize a pseudo-random number generator (PRNG) to drop out a desired percentage text data and generate text set 108. Modality drop out may involve setting a percentage of elements in text set 104 to values representative of no data (e.g., 0, blank, or NULL) to generate text set 108. However, other alternatives to indicate that no text data is available for a certain percentage of elements in text set 108 are also possible. In one non-limiting embodiment, modality dropout may be implemented by determining the number of elements in text set 104, determining the desired percentage or quantity of elements to be dropped, using a random number generator to select the individual elements to be dropped (up to the desired percentage or quantity), and setting those elements to values representative of no data to generate text set 108. In some embodiments, the desired percentage for modality dropout may be 20%. However other percentages are possible. In some embodiments, the desired percentage for modality dropout could change for each iteration of training the image classification model 150. In some embodiments, where the image set 100 constitutes a subset of a training set, the desired percentage for modality dropout could change after each iteration through the training set, such that all of the images in the training set are utilized. In one non-limiting embodiment, the desired percentage for modality dropout could be set to an initial value (e.g., 0% initially) and changed (e.g., increased) after each iteration through the training set until the desired percentage of modality dropout is reached (e.g., 100%).

Subsequent to modality dropout 106, text set 108 may be processed with a text processor 110 to extract key features that associate text data with the image class of an image. In some embodiments, the text processor 110 may be implemented using a neural network or a subset of layers of a larger neural network to generate encoded representations of the text for a given input. The result that is generated by the layers may be a vector of numbers, such as floating-point numbers.

The output of text processor 110 may be additionally processed using additional processor 112. In some embodiments, this additional processing by additional processor 112 may involve applying an activation function to the individual values of the output vector from text processor 110. In some embodiments, where subsets of the training set are iterated during training, this additional processing may include steps to avoid overfitting to the training set. In further embodiments, the steps to avoid overfitting use batch normalization to normalize the contributions to a layer for every subset of the training set (e.g., mini-batch).

Visual Pathway

With reference to the illustration in FIG. 1A, in visual processing branch 154, image set 100 may be processed using a visual processor 114 to extract visual features relevant to an images class. In some embodiments, operation of visual processing branch 154 may be simultaneous to operation of text processing branch 152. In some embodiments utilizing CNNs, the processing may involve use of convolutional layers and max pooling layers to iteratively "convolve" (e.g., use a sliding window to process portions of) input images and determine a degree to which a particular "feature" (e.g., an edge, text information, an arrangement of text information, or other aspect of an object to be detected) is present in different portions of the input image. The procedure may be performed using any number of sets of convolutional layers and max pooling layers. The result that is generated by the sets of convolutional layers and max pooling layers may be a matrix of numbers, such as floating-point numbers. The matrix may then be converted to a vector for processing by the set of fully-connected layers.

The output of visual processor 114 may be additionally processed using additional processor 116. In some embodiments utilizing neural networks, this additional processing by additional processor 116 may involve applying an activation function to the individual values of the output vector from visual processor 114. In some embodiments, where subsets of the training set are iterated during training, this additional processing may include steps to avoid overfitting to the training set. In further embodiments, the steps to avoid overfitting use batch normalization to normalize the contributions to a layer for every subset of the training set (e.g., mini-batch).

Concatenation and Embedding

At the end of text processing branch 152 and visual processing branch 154, the output from each branch is concatenated, combined to store the key features learned in each branch that indicate the class of an image. The resulting data (e.g., concatenated vector or matrix) may then be reduced in size in an embedding process such that the relationship between the text and visual features identified in each processing branch and the associated image classes are stored and passed to the classifier 120.

Additionally, or alternatively, in some embodiments, the image classification model 150 can continue to be trained by repeating the multi-branch processing described above. In further embodiments, where the image set 100 is a subset of images from a training set, the image set 100 can be updated to iterate through the training set, such that the text data dropped out during modality dropout 106 is different every time. This iteration through the training set can be repeated until a desired stopping point is reached. The model used for visual processing will thereby learn to recognize features, in images that include text information, that are relevant to the image class. Additionally, or alternatively, the model may be further refined with visual processing as shown in FIG. 1B.

Removal of Text Processing Branch and Refinement of Visual Processing Branch

Figure 1B:
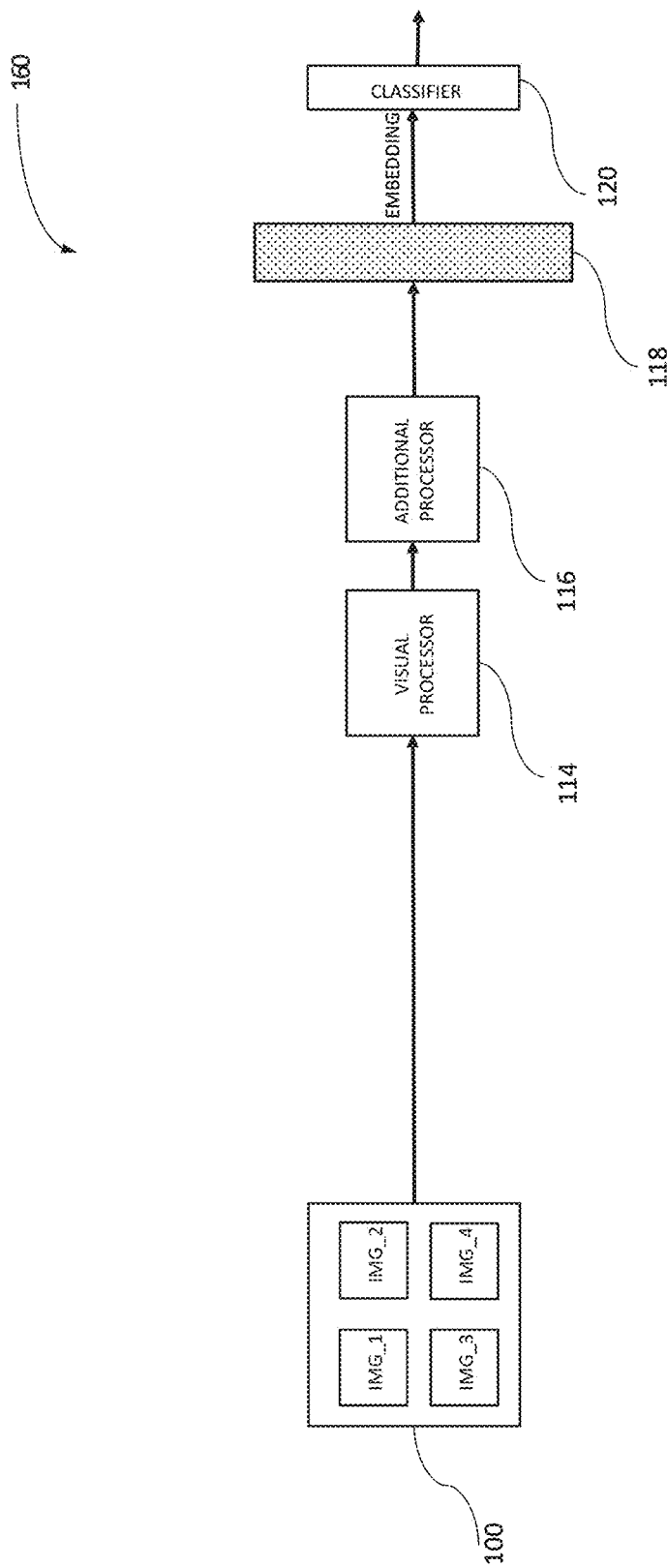
FIG. 1B is a block diagram of an illustrative embodiment of an image classification model in which a branch for text processing has been removed.

In some embodiments, the image classification model 150 is further refined as illustrated in FIG. 1B. Prior to this refinement, the text processing branch 152 is removed. In some embodiments, the text processing branch 152 is removed by adding values representative of no data (e.g., 0, blank, or NULL) to areas of data structure 118 associated with the text processing branch 152. In some embodiments, the text processing branch 152 is removed by changing the structure of the machine learning model itself to produce an image classification model 160 with a single processing branch, rather than multiple processing branches.

Refinement of the model 160 may begin with reinitialization of portions of the model 160. Reinitialization may be done by changing the parameters of certain layers (e.g., the weights and biases of the neurons), such as one or more layers of the classifier 120. As described in more detail above, weights are associated with the connections between the layers. Updating the weights can change these connections. In some embodiments this update may occur for the entire classifier 120. In some embodiments, this can be done for a portion of the classifier 120, such as a subset of the weight matrixes of the classification layers. With regards to removing the text processing branch 152, updating the weights to exclude output of the text processing branch removes the connections to the text processing branch.

In refining image classification model 160, the refinement may be based on performing additional training (e.g., one or more training epochs) and evaluation using a loss function (e.g., mean squared error loss). Based on this evaluation for one or more images, certain the parameters of the image classification model 160 may be modified. For example, a gradient descent algorithm may be used to determine the gradient of a loss function computed based on the training output and the desired output (e.g., classification with which each image is tagged). The gradient may then be used to adjust the parameters of the classifier 120 in particular directions and/or magnitudes so that subsequent processing of the same images will produce classification output closer to the desired output. This process may be repeated in an iterative manner until a desired stopping point is reached. For example, the desired stopping point may correspond to satisfaction of an accuracy metric, exhaustion of a quantity of training time or training iterations, etc.

Example Multi-Branch Training Flow for Image Classification Model

Figure 2:
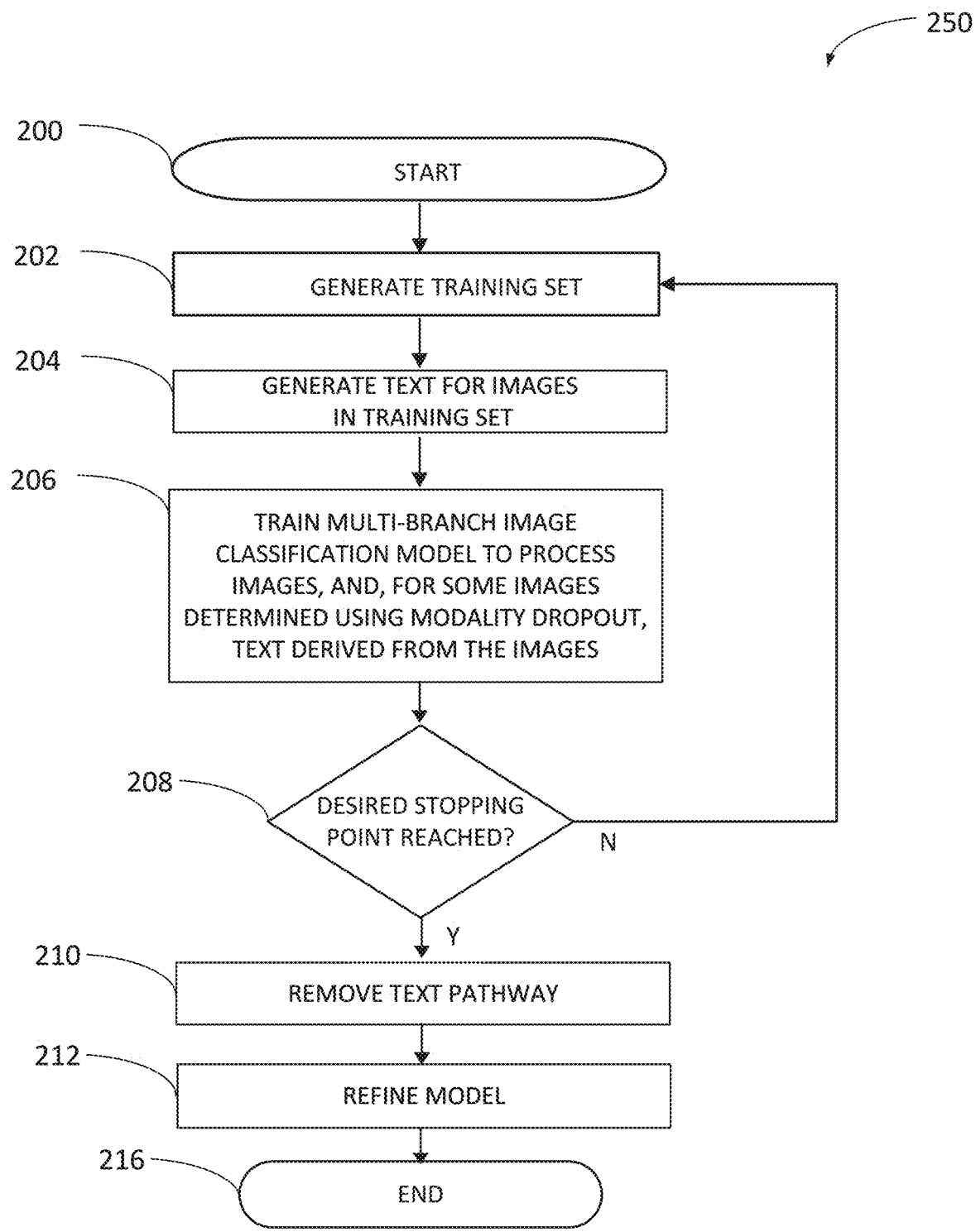
FIG. 2 is a flow diagram illustrating an embodiment of a routine for multi-branch training of an image classification model.

FIG. 2 illustrates example routine 250 for training an image classification model using modality dropout. The routine 250 begins at block 200. The routine 250 may begin in response to an event, such as receipt of a request to start training of an image classification model. The request may indicate a training set of images to be used during training of the image classification model. Additionally, or alternately, at block 202, the training set can be generated. In some embodiments, images in the training set may be pre-processed prior to, or as part of the process of, generating training data upon which to train a machine learning model. For example, the resolution of images may be standardized to a resolution upon which the image classification model is configured to operate (e.g., based on the size of various layers of the model). As another example, tags representing image class may be added to each image in the training set, as described in more detail above. The training set may also be split into subsets (e.g., mini-batches) that iterate through the training flow until all images in the training set have been used. Alternately, the entire training set may be used in training the image classification model. Alternately, only part of the training set may be used in the training.

At block 204, the text data in the training set is detected and a text set for image in the training set is generated. In some embodiments, the text detection method may be OCR.

At block 206, the multi-branch image classification model 150 is trained. In some embodiments, the training that occurs in block 204 produces a trained multi-branch intermediate model, one branch of which is removed to generate a model for deployment and use of the generated model at inference. The intermediate model may be trained to recognize patterns in the way images with text information are classified in order to classify images without relying on the text information itself. In some examples, the intermediate model has two or more processing pathways, such as a text processing branch and a visual processing branch, as shown in FIG. 1A. In these embodiments, the text processing branch extracts and processes text-based data from the training set using a text processor to learn key features associated with image class, and the visual processing branch similarly utilizes visual-based information from the training set using a visual processor to learn key features associated with image class. The output of these processing branches is combined and stored to store the relationship between the learned features and the image class. In the text processing branch, a desired percentage of textual information is excluded (e.g., dropped out) in a modality dropout process during training at this block. As discussed in more detail above, the exclusion of the desired percentage of text data is random or pseudo-random. The text data that is dropped out may be different each time the training is iterated. Iteration, as used herein may mean each epoch, where an epoch is one pass through the training set. Iteration may also mean each mini-batch. In addition, the text data that is dropped out may be information that is selected by a human operator. As described in more detail above, the desired percentage of modality dropout can be changed for each iteration. This process may be repeated in an iterative manner until a desired stopping point is reached. For example, the desired stopping point may correspond to satisfaction of an accuracy metric, exhaustion of a quantity of training time or training iterations, etc.

If the desired stopping point has not been reached at block 208, the process described in FIG. 2 may be repeated in an iterative manner until a desired stopping point has been reached. In some embodiments the entire training set can be used in each training iteration (e.g., epoch). Additionally, or alternatively, the images in the training set may be split into mini-batches, subsets of images from the training set. These mini-batches may be used to train the model iteratively, until all images from the training set have been used. This process can be repeated until the desired stopping point has been reached.

If the desired stopping point has been reached at block 208, then at block 210 the text processing branch can be removed from the image classification model.

With regards to the removal of the text processing branch in block 210, in some embodiments, the text processing branch is removed by adding values representative of no data (e.g., 0, blank, or NULL) to areas of data structure associated with the text processing branch 152. In some embodiments, the text processing branch is removed by changing the structure of the machine learning model itself to produce an image classification model with a single processing branch, rather than multiple processing branches.

After the text processing branch is removed at block 210, the visual processing branch can be optionally refined at block 212. Refinement of the classification model may begin with reinitialization of portions of the classifier. Reinitialization may be done by changing the parameters of certain layers (e.g., the weights and biases of the neurons), such as one or more layers of the classifier 120. As described in more detail above, weights are associated with the connections between the layers. Updating the weights can change these connections. In some embodiments this update may occur for the entire classifier. In some embodiments, this can be done for a portion of the classifier, such as the weight matrixes of the classification layers. In refining the classifier, the refinement may be based on performing additional training (e.g., one or more training epochs) and evaluation using a loss function (e.g., mean squared error loss). Based on this evaluation for one or more images, certain the parameters of the classifier may be modified. For example, a gradient descent algorithm may be used to determine the gradient of a loss function computed based on the training output and the desired output (e.g., classification with which each image is tagged). The gradient may then be used to adjust the parameters of the classifier in particular directions and/or magnitudes so that subsequent processing of the same images will produce classification output closer to the desired output. This process may be repeated in an iterative manner until a desired stopping point is reached. For example, the desired stopping point may correspond to satisfaction of an accuracy metric, exhaustion of a quantity of training time or training iterations, etc.

The routine 250 ends at block 216.

Example Differential Input Student-Teacher Model

Figure 3:
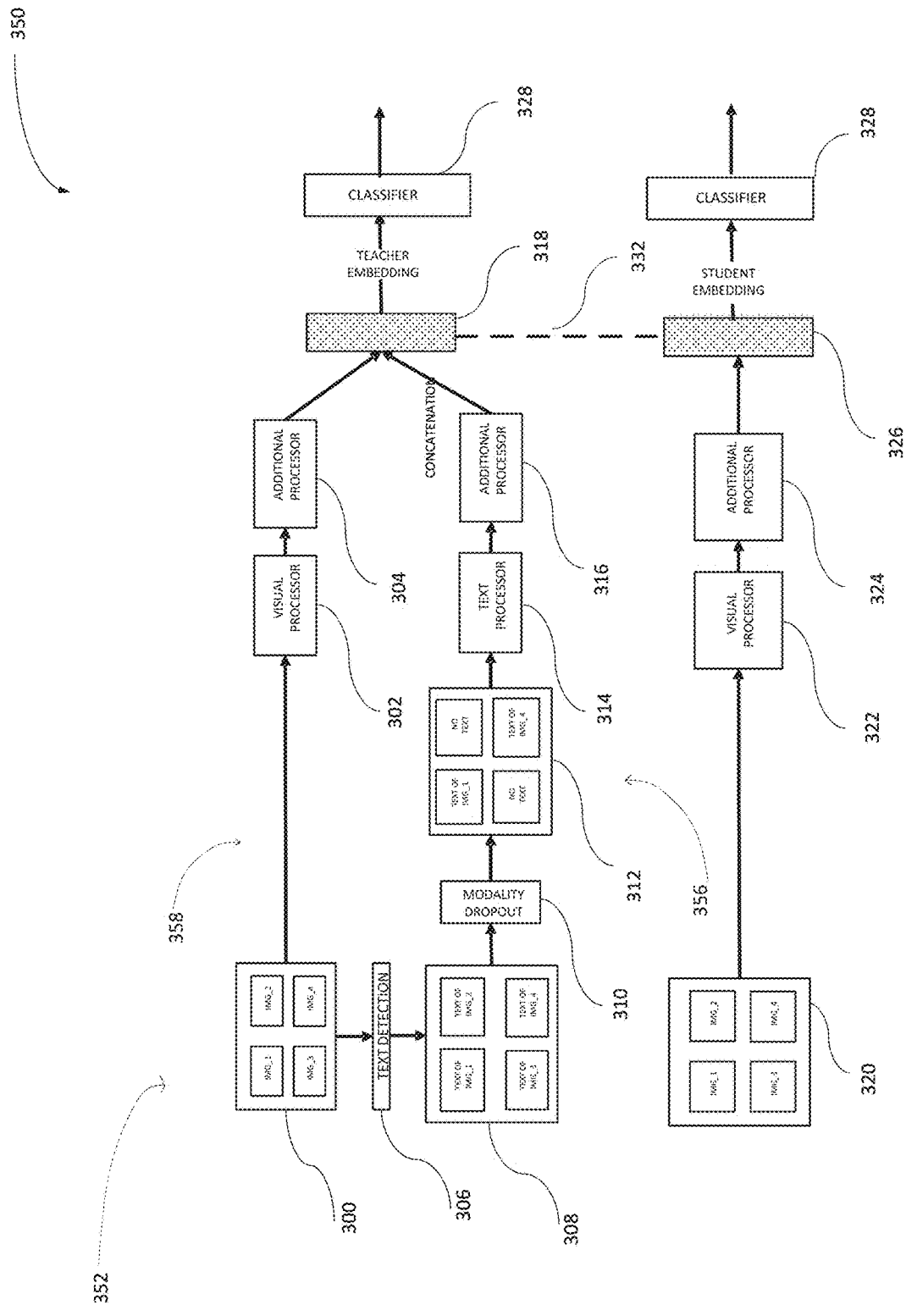
FIG. 3 is a block diagram of an embodiment of a student teacher training model with differential input.

With reference to an illustrative example, FIG. 3 shows a teacher student training system 350. The teacher student training system 350 may train two or more machine learning models. These machine learning models could include a teacher model 352 and a student model 354. The teacher model 352 may be an intermediate model (e.g., the teacher model 352 may be removed after the training of the student model 354 has reached a desired stopping point). In some embodiments, the teacher model 352 may be or include a CNN. For example, the teacher model 352 may be the same as, or similar to, multi-branch image classification model 150 described in more detail above.

An image set 300 may be used in the teacher model 352 as part of teacher student training system 350. Image set 300 may constitute a training set of all of the images used in training the models within teacher student training system 350. Image set 300 may also constitute a subset of images in a larger training set. Images in the training set may be obtained from users. Images in the training set may include images associated with one or more items. An image set 320 also may be used in the student model 354 as part of teacher student training system 350. Image set 320 may constitute a training set of all of the images used in training the models within teacher student training system 350. Image set 320 may also constitute a subset of images in a larger training set. Images in the training set may be obtained from users. Images in the training set may include images associated with one or more items. In some embodiments, the image set 300 and the image set 320 may be the same image set (e.g., the image sets contain the same images arranged in the same manner).

Figure 4:
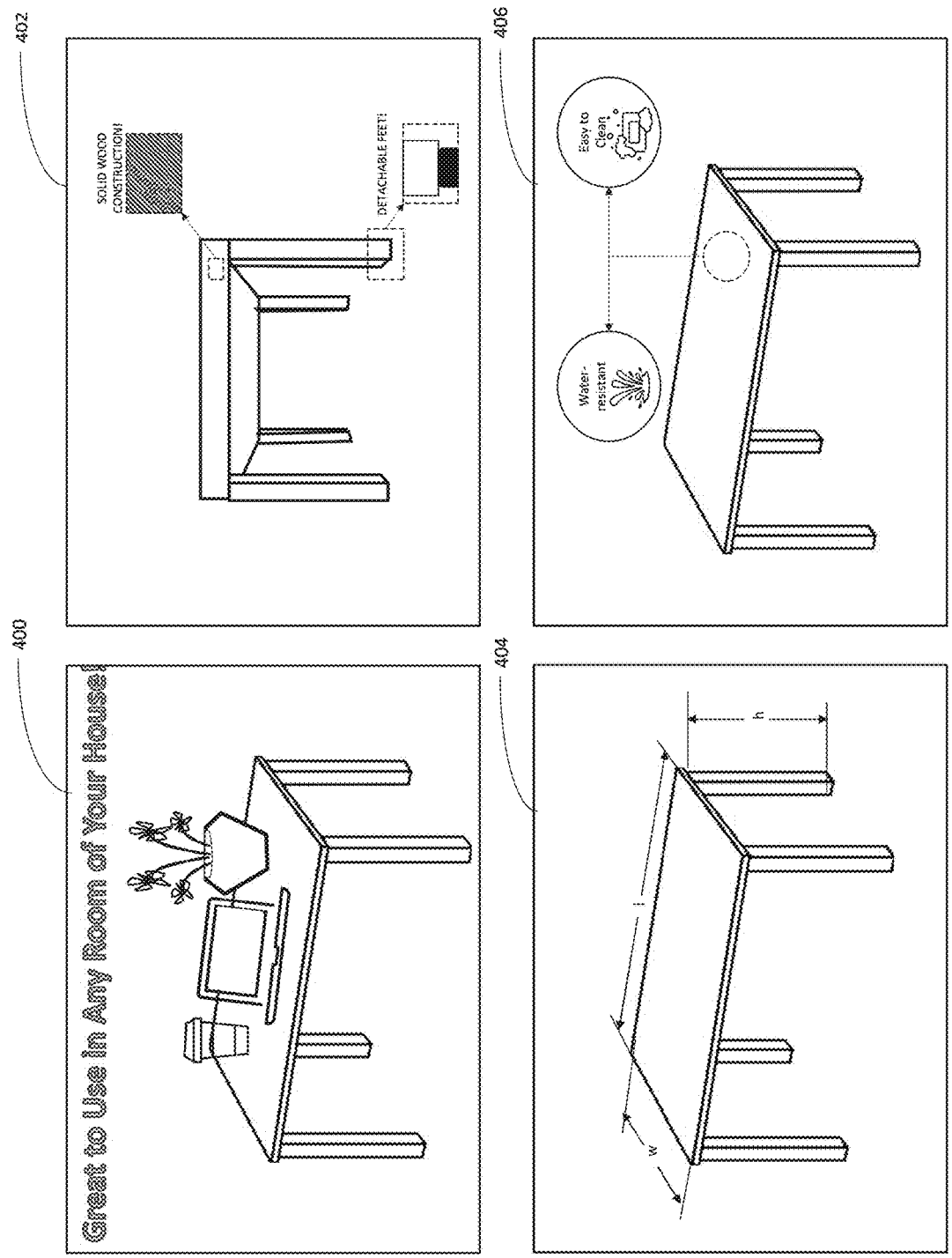
FIG. 4 is illustrating different image classifications according to some embodiments.

Images in the training set may be encoded in a pixel-based format, as described above and some or all of the images may include text that is encoded with the visual data in the pixel-based format. Images in the training set may be pre-tagged with image class information regarding the class (or classes) into which the image is properly classified. Illustrative examples of images are shown in FIG. 4 and described in greater detail above.

As illustrated by FIG. 3, teacher model 352 may be trained by processing image set 300 using two (or more) processing branches. Each processing branch may process different aspects of the image set 300. In some examples, these could include visual information and separate textual information extracted for the images of the image set 300.

As further illustrated by FIG. 3, the teacher model 352 uses text processing branch 356 and visual processing branch 358. The output from these branches is combined into data structure 318 and an embedding is then passed to classifier 328. This process can be repeated until a desired stopping point is reached, as discussed in more detail below.

With regard to text processing branch 356, image set 300 may first be processed with text detector 306. Text detector 306 may use text detection, such as OCR, to extract text data in a character-based format from image set 300. The output of text detector 306 may become text set 308, which may contain text data associated with the images from image set 300.

In modality dropout 310, a percentage of text data of text set 308 may excluded from further processing by the text processing branch 356 (e.g., "dropped out"). In some embodiments, modality dropout 310 may utilize a random number generator to drop out a desired percentage text data and generate text set 108. Modality drop out may involve setting a percentage of elements in text set 308 to values representative of no data (e.g., 0, blank, or NULL) to generate text set 312. However, other alternatives to indicate that no text data is available for a certain percentage of elements in text set 312 are also possible. Additional details regarding dropout are provided above.

In some embodiments, modality dropout 310 is not performed in the text processing branch 356 of the teacher model 352, such that text set 308 is sent to text processor 314 directly.

At text processor 314, in some embodiments, the text processor 314 may be implemented using a neural network or a subset of layers of a larger neural network to generate encoded representations of the text for a given input. The result that is generated by the layers may be a vector of numbers, such as floating-point numbers. The output of text processor 314 may be additionally processed using additional processor 316. In some embodiments, this additional processing by additional processor 316 may involve applying an activation function to the individual values of the output vector from text processor 314. In some embodiments, where subsets of the training set are iterated during training, this additional processing may include steps to avoid overfitting to the training set. In further embodiments, the steps to avoid overfitting use batch normalization to normalize the contributions to a layer for every subset of the training set (e.g., mini-batch).

In visual processing branch 358, image set 300 may be processed using a visual processor 302 to extract visual features relevant to an images class. In some embodiments, operation of visual processing branch 358 may be simultaneous to operation of text processing branch 356. In some embodiments utilizing CNNs, the processing may involve use of convolutional layers and max pooling layers, as described in more detail above. The result that is generated by the sets of convolutional layers and max pooling layers may be a matrix of numbers, such as floating-point numbers. The matrix may then be converted to a vector for processing by the set of fully-connected layers.

The output of visual processor 302 may be additionally processed using additional processor 304. In some embodiments, this additional processing by additional processor 304 may involve applying an activation function to the individual values of the output vector from visual processor 302. In some embodiments, where subsets of the training set are iterated during training, this additional processing may include steps to avoid overfitting to the training set. In further embodiments, the steps to avoid overfitting use batch normalization to normalize the contributions to a layer for every subset of the training set (e.g., mini-batch).

At the end of text processing branch 356 and visual processing branch 358, the output from each branch is concatenated, combined to store the key features learned in each branch that indicate the class of an image. The resulting data (e.g., concatenated vector or matrix) may then be reduced in size in an embedding process such that the relationship between the text and visual features identified in each processing branch and the associated image classes are stored and passed to the classifier 328.

branch processing branch Additionally, or alternatively, in some embodiments, the teacher model 352 can continue to be trained by repeating the multi-branch processing described above. In further embodiments, where the image set 300 is a subset of images from a training set. In embodiments that use modality dropout 310, the desired percentage of modality dropout can change in each iteration, such that the textual information dropped out is different in each iteration. This iteration through the training set can be repeated until a desired stopping point is reached. The model used for visual processing will thereby learn to recognize features related to text data that are relevant to the image class.

As illustrated by FIG. 3, the student model 354 can be trained by processing image set 320 using a visual processor 322. With regards to the visual processor 322, in some embodiments utilizing CNNs, the processing may involve use of convolutional layers and max pooling layers, as described in more detail above. The result that is generated by the sets of convolutional layers and max pooling layers may be a matrix of numbers, such as floating-point numbers. The matrix may then be converted to a vector for processing by the set of fully-connected layers.

The output of visual processor 322 may be additionally processed using additional processor 324. In some embodiments, this additional processing by additional processor 324 may involve applying an activation function to the individual values of the output vector from visual processor 322. In some embodiments, where subsets of the training set are iterated during training, this additional processing may include steps to avoid overfitting to the training set. In further embodiments, the steps to avoid overfitting use batch normalization to normalize the contributions to a layer for every subset of the training set (e.g., mini-batch). The output of the student model 354 may be reduced in size in an embedding process such that the relationship of the features identified in the model and the associated image classes are stored and passed to the classifier 328.

The teacher model 352 may supervise the learning of the student model 354 . . . . For example, in some embodiments, intermediate results of the teacher model 352 may be compared to, or otherwise used to train the student model 354 to generate, corresponding intermediate results. For example, the final embedding of the student model 354 may be compared to the final embedding of the teacher model 352, as indicated by the connector 332. Additionally, or alternatively, the output of the student model 354 may be compared to the output of the teacher model 352. Biases may be added to or adjusted in the student model 354 to account for differences between the models. This process can be repeated until a desired stopping point is reached. The teacher model 352 may then be removed. Following the removal of the teacher model 352, the student model 354 may in some embodiments be further refined (e.g., using the refinement process described above with respect to FIG. 2).

Example Image Selection Flow

Figure 5A:
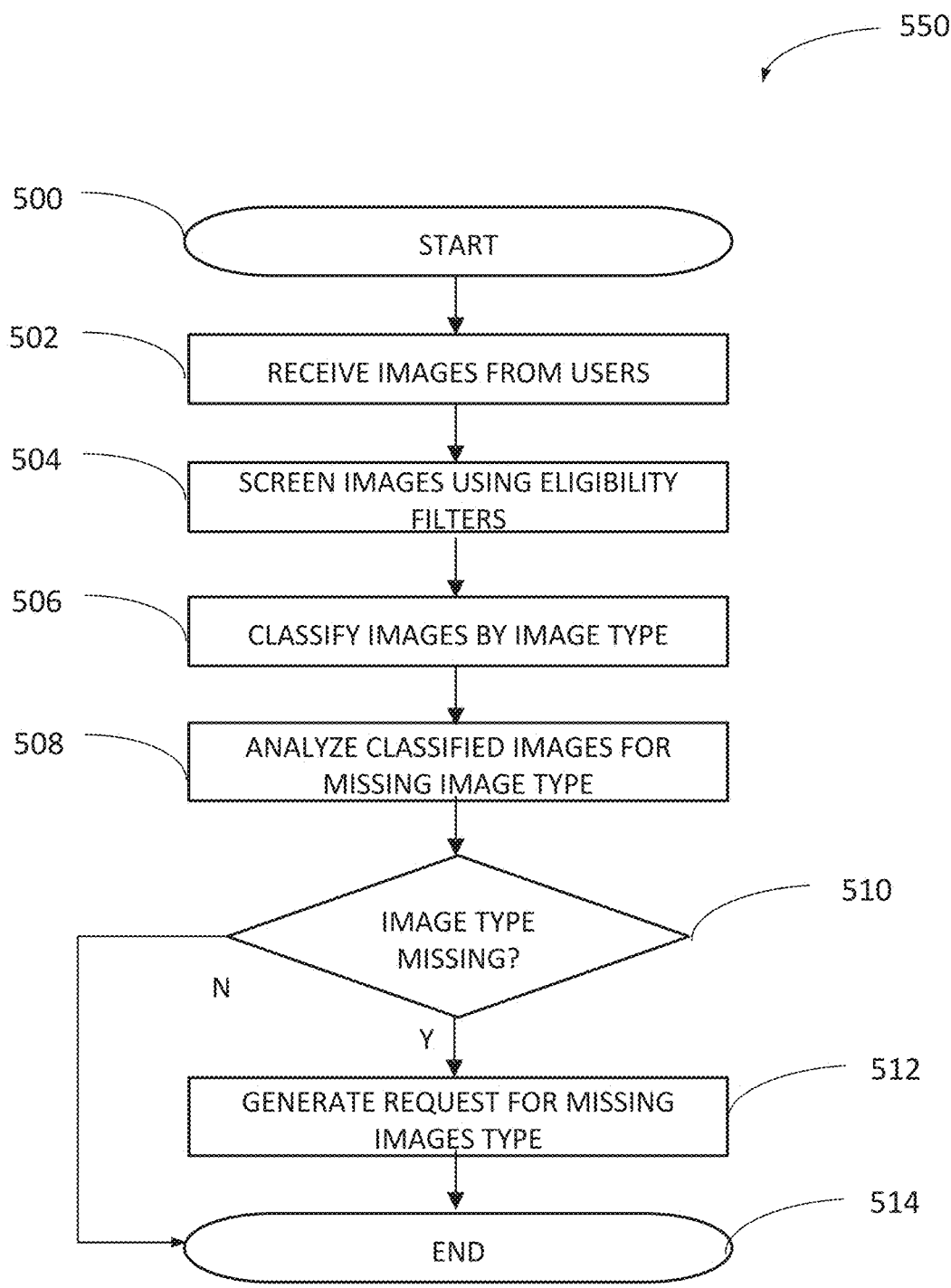
FIG. 5A is a flow diagram illustrative of a routine for image classification and selection from a combination of sources according to some embodiments.

FIG. 5A illustrates example routine 550 which may be performed by an image set generation system for an item. The routine 550 may be used to generate an image set for an item from a combination of sources. Additionally, or alternatively, the routine 550 may be used to verify that an item has images in the image classes that are determined to be helpful for the item's item type (e.g., the preferred image set for the item type). If the verification fails (e.g., if an image class from the preferred image set for the item type is determined to be missing from the item's image set), then the image set generation system may generate a request for the image class. Additionally, or alternatively, the image set generation system may complete the image set for the item.

The routine 550 begins in block 500. The routine 550 may begin in response to an event, such as receipt by the image set generation system of images submitted by a client device.

Figure 6:
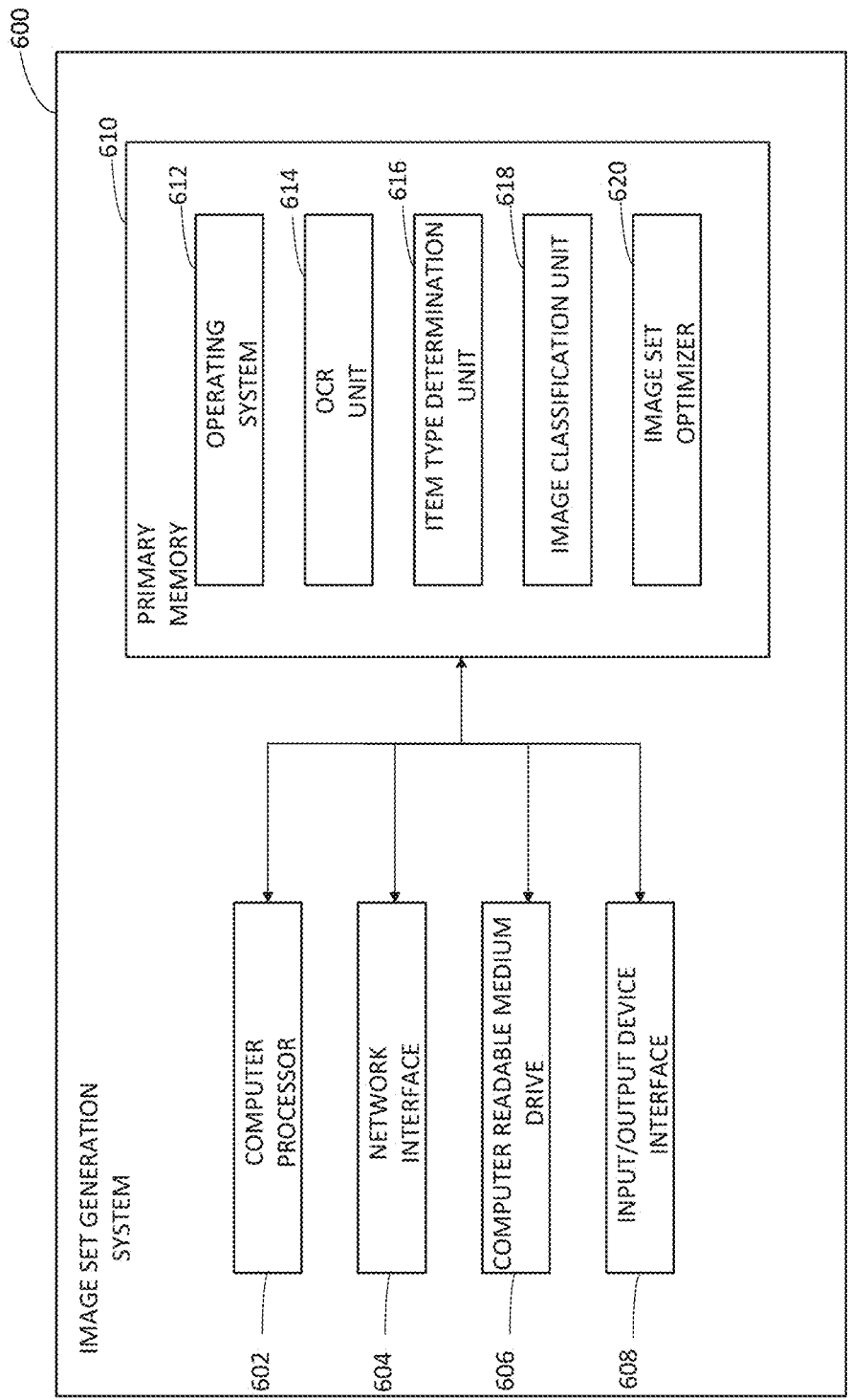
FIG. 6 is a block diagram of an illustrative computing system configured to provide more resource-efficient image classification according to some embodiments.

When the routine 550 is initiated, a set of executable program instructions stored on one or more non-transitory computer-readable media (e.g., hard drive, flash memory, removable media, etc.) may be loaded into memory (e.g., random access memory or RAM) of an computing system, such as the image set generation system 600 shown in FIG. 6, and executed by one or more processors. In some embodiments, the routine 550 or portions thereof may be implemented on multiple processors, serially or in parallel.

At block 502, the image set generation system 600 can receive images from users. For example, the users may submit the images in conjunction with submitting a listing an item via a network resource. In some embodiments, the network resource may be a web page, such as a page defined by a Hypertext Markup Language (HTML) file or stream. The submitted images may be labelled with the item's type or with the image's class (e.g., as specified by the user). However, submission of unlabeled images is also possible. Submission of generically named images (e.g., IMG001) is also possible.

At block 504, the images may be screened by eligibility filters. The eligibility filters may include filters to screen out images that do not relate to the item. In some embodiments, the eligibility filters may be used to screen out images associated with illegal content. Illegal content that may be screened out by the eligibility filters may include, but is not limited to, copyrighted content, content related to drugs, and content related to drug paraphernalia. In further embodiments, machine intelligence may be used to determine what images should be screened out by eligibility filters.

At block 506, the image set generation system 600 can classify images. In some embodiments, this classification utilizes an image classification model, such as the one described above.

At block 508, the image generation system 600 can analyze an existing image set for an item to determine whether one or more image classes from the existing image set are missing. In some non-limiting embodiments, image classifications are determined to be missing after comparison with a preferred image set determined for the item's type.

If an image class is determined to be missing in block 510, then a request may be generated to collect the missing image class at block 512. In some examples, a request for missing images is sent to users related to an item. Additionally, or alternatively, a request for missing images may be sent to software which generates the missing images. As a non-limiting example, if the software receives a request for a dimension image, the software may look at other images and text submitted as part of a catalog for the item to assemble a dimension image. The routine 550 ends at block 514.

Figure 5B:
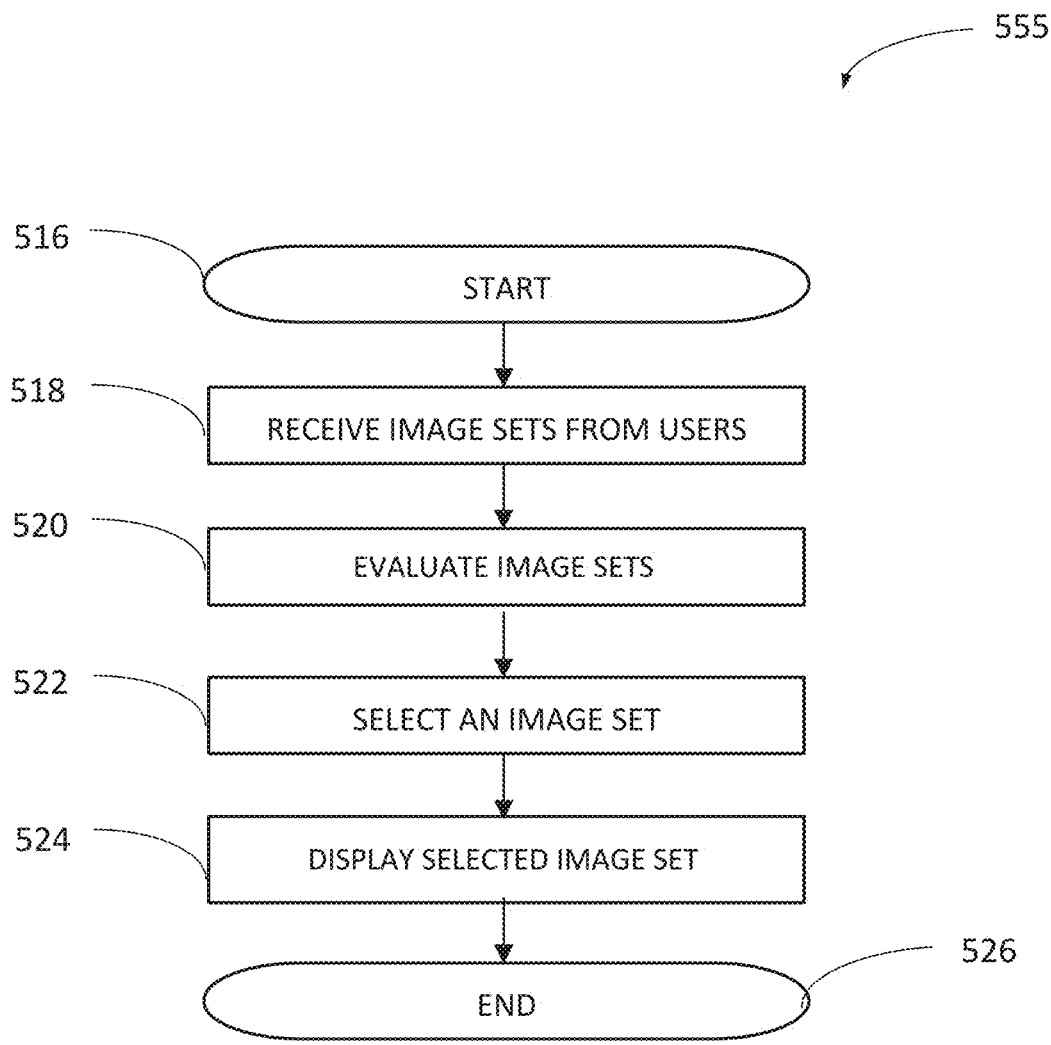
FIG. 5B is a flow diagram illustrative of a routine for image classification and selection of a submitted image set according to some embodiments.

FIG. 5B illustrates example routine 555 which may be performed by an image set generation system for an item. The routine 555 may be used to select an image set for an item from a plurality of image sets submitted by users. In some embodiments, routine 555 or portions thereof may be performed in addition to the routine 550 or portions thereof discussed above. For example, the routine 555 or portions thereof may be performed before, after or simultaneously with the routine 555 or portions thereof.

The routine 555 begins in block 516. The routine 555 may begin in response to an event, such as receipt by the image set generation system of image sets submitted by multiple users. Receipt of images in block 518 may continue for a determined period of time before proceeding to block 520. Additionally, or alternatively, each image set received in block 518 may be sent to block 520 as it is received and be held at block 520 for a determined period of time.

At block 520, the images may be screened by eligibility filters, as discussed in more detail above. Additionally, or alternatively, the images within the plurality of image sets may be classified using an image classification model, such as the one described above. Each image set of the plurality of image sets may be scored based on a plurality of parameters. These parameters include, but are not limited to, the diversity of image classes contained in the image set, what percentage of the image classes of the preferred image set, described above, are contained in the image set being scored, and the identity of the user who submitted the image set. As a non-limiting example of scoring based on these parameters, for an item type of furniture, a dimension image may have a higher score than a nutrition image. As a further non-limiting example, if more than one image of a particular image class is present in an image set, only the first image may receive a score that contributes to the overall score of the image set.

At block 522, an image set may be selected based on the image set score. In some embodiments, a request or requests may be generated when image classes in the preferred image set are not present in the selected image set. The generated request may be sent to the user who submitted the selected image set. Additionally, or alternatively, the request may be sent to another system to generate the missing image, as described in more detail above. At block 524, the resulting selected image set may be used in displays generated for the item. The routine ends at block 526.

Execution Environment

FIG. 6 illustrates various components of an example image classification system 600 configured to implement various functionality described herein.

In some embodiments, the image classification system 600 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by image classification system 600 may be implemented as web services consumable via one or more communication networks. In further embodiments, image classification system 600 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, an image set generation 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SSDs"), flash drives, and/or other persistent non-transitory computer readable media; one or more input/output device interfaces; and one or more computer-readable memories 610, such as random access memory ("RAM") and/or other volatile non-transitory computer readable media.

The computer-readable memory 610 may include computer program instructions that one or more computer processors 602 execute and/or data that the one or more computer processors 602 use in order to implement one or more embodiments. For example, the computer-readable memory 610 can store an operating system 612 to provide general administration of the image classification system 600. As another example, the computer readable memory 610 can store an optical character recognition ("OCR") unit 614 for recognizing segments of an image that include text and extracting the text from those segments. In some embodiments, such as when the image classification system 600 is training an image classification model (e.g., by executing routine 250), the OCR unit may be used during training of the image classification system 600 but would not be used when the image classification system 600 is deployed. As another example, the computer-readable memory 610 can store an item type determination unit 616 for determining a preferred image set for an item type and for associating items with an item type. As another example, the computer-readable memory 610 can store an image classification unit 618 for classifying images obtained for an item. As another example, the computer-readable memory 610 can store an image set optimizer 620 for determining whether image classifications are missing as compared to a preferred image set determined for the item type of an item, for generating a request for missing images, and for adding missing images to an image set for an item. In some embodiments, the generated request may be sent to users to submit the missing images. In some embodiments, the generated request may be sent to a system which generates the missing images.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.) The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
computer-readable memory storing a plurality of image files encoded in a pixel-based format, wherein a first image file of the plurality of image files comprises data, encoded in the pixel-based format, representing a first image including first text; and
one or more processors in communication with the computer-readable memory and programmed by executable instructions to:
select, based at least partly on a pseudo-random number generator, a subset of the plurality of image files for which text data is to be obtained;
obtain text data encoded in a character-based format for each image file of the subset of the plurality of image files, wherein first text data obtained for the first image file is encoded in the character-based format and represents the first text, and wherein no text data is obtained for images file not selected for the subset of the plurality of image files;
obtain a plurality of classification labels, wherein individual classification labels of the plurality of classification labels represent desired classification output for individual image files of the plurality of image files, and wherein the desired classification output for the first image file indicates whether the first image file is to be classified as one or more image classes associated with presentation of network content for an item associated with the first image file;
train a first image classification model using the plurality of image files and the text data for the subset of the plurality of image files, wherein the first image classification model comprises an image processing portion configured to process image input data encoded in the pixel-based format, and a text processing portion configured to process text input data encoded in the character-based format; and
generate a trained image classification model comprising the image processing portion, wherein the text processing portion is excluded from the trained image classification model.

2. The system of claim 1, wherein the one or more processors are further programmed by the executable instructions to train a second image classification model using the plurality of image files,
wherein the second image classification model comprises a second image processing portion configured to process image input data encoded in the pixel-based format,
wherein the second image classification model does not include any text processing portion configured to process text input data encoded in the character-based format, and
wherein the second image classification model is trained using a student-teacher training procedure in which the second image classification model is a student model and the first image classification model is a teacher model.

3. The system of claim 1, wherein the one or more processors are further programmed by the executable instructions to remove the text processing portion from the first image classification model after the first image classification model is trained, wherein the trained image classification model that is generated comprises the first image classification model after removal of the text processing portion.

4. The system of claim 1, wherein the one or more processors are further programmed by the executable instructions to:
remove the text processing portion from the first image classification model;
reinitialize at least a portion of parameters of the first image classification model subsequent to removal of the text processing portion; and
retrain the first image classification model to generate the trained image classification model using at least a subset of the plurality of image files, wherein text input data is not used during training of the first image classification model.

5. A computer-implemented method comprising:
under control of a computing system comprising one or more computer processors configured to execute specific instructions,
obtaining a plurality of image files encoded in a pixel-based format, wherein a first image file of the plurality of image files comprises data, encoded in the pixel-based format, representing a first image including first text;
obtaining text data encoded in a character-based format for each image file of a subset of the plurality of image files, wherein first text data obtained for the first image file is encoded in the character-based format and represents the first text;
training an intermediate classification model using the plurality of image files and the text data for the subset of the plurality of image files and text, wherein the intermediate classification model comprises an image processing portion configured to process image input data encoded in the pixel-based format, and a text processing portion configured to process text input data encoded in the character-based format; and
generating an image classification model comprising the image processing portion, wherein the text processing portion is excluded from the image classification model.

6. The computer-implemented method of claim 5, further comprising obtaining a plurality of classification labels, wherein individual classification labels of the plurality of classification labels represent desired classification output of the intermediate classification model for individual image files of the plurality of image files, and wherein training the intermediate classification model comprises training the intermediate classification model to generate classification output.

7. The computer-implemented method of claim 6, wherein training the intermediate classification model to generate classification output comprises training the intermediate classification model to generate classification output indicating whether an image file is classified as one or more image classes associated with presentation of network content for an item.

8. The computer-implemented method of claim 5, further comprising selecting, based at least partly on a pseudo-random number generator, the subset of the plurality of image files for which text data is to be obtained, wherein no text data is obtained for images file not selected for the subset of the plurality of image files.

9. The computer-implemented method of claim 5, further comprising removing the text processing portion from the intermediate classification model to create the image classification model.

10. The computer-implemented method of claim 9, further comprising performing a refinement process prior to deploying the image classification model, wherein the refinement process comprises:
   reinitializing at least a portion of parameters of the image classification model; and
   training the image classification model using at least a subset of the plurality of image files, wherein text input data is not used during training of the image classification model.

11. The computer-implemented method of claim 10, wherein reinitializing at least the portion of the parameters of the image classification model comprises reinitializing parameters of a classification layer of the image classification model.

12. The computer-implemented method of claim 5, wherein obtaining the text data comprises performing optical character recognition (OCR) to generate the first text data from the first image file.

13. A system comprising:
   computer-readable memory storing executable instructions; and
   one or more processors in communication with the computer-readable memory and programmed by the executable instructions to:
      obtain a plurality of image files encoded in a pixel-based format, wherein a first image file of the plurality of image files comprises data, encoded in the pixel-based format, representing a first image including first text;
      obtain text data encoded in a character-based format for each image file of a subset of the plurality of image files, wherein first text data obtained for the first image file is encoded in the character-based format and represents the first text;
      train an intermediate classification model using the plurality of image files and the text data for the subset of the plurality of image files and text, wherein the intermediate classification model comprises an image processing portion configured to process image input data encoded in the pixel-based format, and a text processing portion configured to process text input data encoded in the character-based format; and
      generate an image classification model comprising the image processing portion, wherein the text processing portion is excluded from the image classification model.

14. The system of claim 13, wherein the one or more processors are further programmed by the executable instructions to obtain a plurality of classification labels, wherein individual classification labels of the plurality of classification labels represent desired classification output of the intermediate classification model for individual image files of the plurality of image files, and wherein training the intermediate classification model comprises training the intermediate classification model to generate classification output.

15. The system of claim 14, wherein to train the intermediate classification model to generate classification output, the one or more processors are further programmed by the executable instructions to train the intermediate classification model to generate classification output indicating whether an image file is classified as one or more image classes associated with presentation of network content for an item.

16. The system of claim 13, wherein the one or more processors are further programmed by the executable instructions to select, based at least partly on a pseudo-random number generator, the subset of the plurality of image files for which text data is to be obtained, wherein no text data is obtained for images file not selected for the subset of the plurality of image files.

17. The system of claim 13, wherein the one or more processors are further programmed by the executable instructions to remove the text processing portion from the intermediate classification model to create the image classification model.

18. The system of claim 17, wherein the one or more processors are further programmed by the executable instructions to perform a refinement process prior to deploying the image classification model, wherein the refinement process comprises:
   reinitializing at least a portion of parameters of the image classification model; and
   training the image classification model using at least a subset of the plurality of image files, wherein text input data is not used during training of the image classification model.

19. The system of claim 18, wherein to reinitialize at least the portion of the parameters of the image classification model, the one or more processors are further programmed by executable instructions to reinitialize parameters of a classification layer of the image classification model.

20. The system of claim 13, wherein to obtain the text data, the one or more processors are further programmed by the executable instructions to perform optical character recognition (OCR) to generate the first text data from the first image file.

* * * * *